United States Patent
McCullough

(10) Patent No.: US 6,632,901 B2
(45) Date of Patent: *Oct. 14, 2003

(54) POLYMERIZATION PROCESS USING AN IMPROVED BULKY LIGAND METALLOCENE-TYPE CATALYST SYSTEM

(75) Inventor: Laughlin G. McCullough, League City, TX (US)

(73) Assignee: Univation Technologies, LLC, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,916

(22) Filed: Nov. 13, 1998

(65) Prior Publication Data

US 2002/0032287 A1 Mar. 14, 2002

Related U.S. Application Data

(60) Provisional application No. 60/097,401, filed on Aug. 21, 1998.

(51) Int. Cl.$^7$ .............................. C08F 4/64; C08F 4/642
(52) U.S. Cl. ..................... 526/165; 526/68; 526/129; 526/160; 526/165; 526/170; 526/943
(58) Field of Search ................... 526/68, 129, 170, 526/160, 165, 943, 901

(56) References Cited

U.S. PATENT DOCUMENTS

| | | | |
|---|---|---|---|
| 4,588,790 A | 5/1986 | Jenkins, III et al. | 526/70 |
| 4,808,561 A | 2/1989 | Welborn | 502/104 |
| 4,874,880 A | 10/1989 | Miya et al. | 556/53 |
| 5,405,922 A | * 4/1995 | DeChekkis et al. | 526/68 |
| 5,763,543 A | * 6/1998 | Muhle et al. | 526/68 |
| 6,291,615 B1 | 9/2001 | Dauben et al. | 526/160 |
| 6,303,718 B1 | 10/2001 | Becke et al. | 526/160 |

FOREIGN PATENT DOCUMENTS

| | | |
|---|---|---|
| DE | 4332009 A1 | 3/1995 |
| DE | 19706027 A1 | 8/1998 |
| EP | 0200351 A2 | 5/1986 |
| EP | 0519746 A1 | 12/1992 |
| EP | 0705849 A1 | 4/1996 |
| WO | WO 97/07141 | 2/1997 |

OTHER PUBLICATIONS

American Chemical Society, 1997, *Macromolecules*, vol. 30, No. 25, Dec. 15, 1997, pp. 7647–7650.

*Organometallics*, vol. 15, No. 3, 1996, Reaction of (n5–C5Me5)XrFe, (n5–C5Me4Et)ZrF3,(n5–C5Me5)2Zrf2, (n5C5Me5)HfF3, and (n5–C5Me5)TaF4 with AlMe3. Structure of the First Hafnium–Aluminum–Carbon Cluster, pp. 909–917.

Synthesis and spectroscopic charaterization of a series of substituted cyclopentadienyl Group 4 fluorides; crystal structure of the acetylacetonato complex [(acac)2(n–C5Me5)Zr(u–F)SnMe3Cl], Nov. 1995.

Journal of Molecular Catalysis A: Chemical 101 (1995) p. 199–209, *XPS study of metallocene based catalysts for the polymerization of ethylene.*

* cited by examiner

*Primary Examiner*—Caixia Lu
(74) *Attorney, Agent, or Firm*—Jaimes Sner; Lisa Kimes Jones; Kevin M. Faulkner

(57) ABSTRACT

The present invention relates to a polymerization process in the presence of a bulky ligand metallocene-type catalyst compound having an abstractable fluoride or fluorine containing leaving group.

22 Claims, No Drawings

POLYMERIZATION PROCESS USING AN IMPROVED BULKY LIGAND METALLOCENE-TYPE CATALYST SYSTEM

CROSS-REFERENCE TO RELATED APPLICATION

This patent application claims priority from Provisional U.S. Application Serial No. 60/097,401 filed Aug. 21, 1998, and is herein fully incorporated by reference.

FIELD OF THE INVENTION

The present invention relates to a polymerization process using an improved bulky ligand metallocene-type catalyst system. The catalyst system comprises a bulky ligand metallocene-type compound having at least one fluoride leaving group or fluorine containing leaving group. At least one leaving group is abstractable from the bulky ligand metallocene type compound to render it catalytically active in the polymerization of olefins.

BACKGROUND OF THE INVENTION

Advances in polymerization and catalysis have resulted in the ability to produce many new polymers having improved physical and chemical properties useful in a wide variety of superior products and applications. With the development of new catalysts the choice of polymerization process (solution, slurry, high pressure or gas phase) for producing a particular polymer have been greatly expanded. Also, advances in polymerization technology has provided more efficient, highly productive and economically enhanced processes. Especially illustrative of these advances is the development of the technology field utilizing bulky ligand metallocene-type catalyst systems.

As with a new technology field, particularly in the polyolefins industry, a small savings in cost often determines whether a commercial endeavor is even feasible. This aspect in the metallocene technology field is evident by the number of participants in the industry looking for new ways to reduce cost. In particular, there has been tremendous focus in the industry on developing new and improved bulky ligand metallocene-type catalyst systems. Some have focused on designing the catalyst systems to produce new polymers, others on improved operability, and many more on improving catalyst productivity. The productivity of a catalyst, that is the amount of polymer produced per gram of the catalyst, usually is the key economic factor that can make or break a new commercial development in the polyolefin industry.

From the early stages in the metallocene technology field, beginning with the discovery of the utility of alumoxane as a cocatalyst in the early 1980's, to the discovery of substitutions on the bulky ligands of the metallocene-type compounds, through the development of non-coordinating anions, and today with the ever increasing number of new metallocene-type bulky ligand compounds, catalyst productivity has been a primary focus.

Evidence of this can be seen in this subset of the art discussing various bulky ligand metallocene-type catalyst compounds and catalyst systems described in U.S. Pat. Nos. 4,530,914, 4,542,199, 4,769,510, 4,871,705, 4,937,299, 5,017,714, 5,055,438, 5,096,867, 5,130,030, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664 and 5,814,574, European Patent Nos. EP-A-0 591 756, EP-A-0 520 732, EP-A-0 420 436, EP-B1 0 485 822, EP-B1 0 485 823, EP-A2-0 743 324 and EP-B1 0 518 092 and PCT Publication Nos. WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144.

There are many more examples in the metallocene-type art. However, there is a small subset that discuss the importance of the leaving group, the ligand capable of being abstracted and rendering the metallocene-type catalyst system capable of polymerizing olefins. Some in art discuss using chloride or methyl leaving groups, for example U.S. Pat. Nos. 4,542,199 and 4,404,344 respectively.

Much of the metallocene-type art discuss the use generally of halogens as leaving groups. For example, European publication EP-A2 0 200 351 published in Nov. 5, 1986 mentions in a laundry list of possibilities, a few compounds having fluoride leaving groups, as does EP-A 1 0 705 849 published Apr. 10, 1996. However, although halogens are typically discussed in much of the art, the predominant focus has been on chlorine as a leaving group.

There are some disclosures and exemplifications of these compounds having fluoride groups in the art, for example:

E. F. Murphy, et al., "Synthesis and spectroscopic characterization of a series of substituted cyclopentadienyl Group 4 fluorides; crystal structure of the acetlacetonato complex [(acac)$_2$($\eta^5$-C$_5$Me$_5$)Zr($\mu$-F)SnMe$_3$Cl]", Dalton, (1996), 1983 incorporated herein by reference, describes the synthesis of some mono- and di-substituted cyclopentadienyl Group 4 fluoride compounds.

Herzog, et al., "Reactions of ($\eta^5$-C$_5$Me$_5$)ZrF$_3$, ($\eta^5$-C$_5$Me$_4$Et)ZrF$_3$, ($\eta^5$-C$_5$M4$_5$)$_2$ZrF$_2$, ($\eta^5$-C$_5$Me$_5$)HfF$_3$, and ($\eta^5$-C$_5$Me$_5$)TaF$_4$ with AlMe$_3$. Structure of the First Hafnium-Aluminum-Carbon Cluster", Organometallics 1996, 15, 909–917, incorporated herein by reference, describes the reactions of various compounds having fluoride leaving groups with an aluminum compound.

F. Garbassi, et al., Journal of Molecular Catalysis A: Chemical 101 (1995) 199–209 illustrates the binding energy of various leaving groups on zirconium compounds. In particular this article shows that a catalyst system of bis (cyclopentadienyl)zirconium dichloride in the polymerization of ethylene is more active than the di-fluoride analog.

PCT publication WO 97/07141 published Feb. 27, 1997 describes a number of metallocene-type compounds with fluoride leaving groups. This publication exemplifies their use with methylalumoxane in the polymerization of styrene and shows a single bis(cyclopentadienyl) titanium monofluoride having a very low productivity. Also, Kaminsky, et al., "Fluorinated Half-Sandwich Complexes as Catalysts in Syndiospecific Styrene Polymerization", Macromolecules, Vol. 30, No. 25, 1997 describes that unbridged monocyclopentadienyl titanium trifluoride catalysts have a higher activity than the chlorinated compounds in the polymerization of styrene in the temperature range of from 10° C. to 70° C.

German publication DE 43 32 009 A1 describes a process for making organometallic fluorides by reacting an organometallic halide with tin fluoride. This publication appears to show that an unsupported catalyst system of methylalumoxane and a bis(pentamethylcyclopentadienyl)zirconium dichloride has a lower homopolyethylene productivity compared with double the amount of the difluoride at 70° C.

Considering the discussion above there is still a need for higher productivity catalyst systems capable of providing the efficiencies necessary for implementing commercial polyolefin process. Thus, it would be highly advantageous to have a polymerization process capable of producing new and improved polymers with improved catalyst productivities.

SUMMARY OF THE INVENTION

This invention provides for a process for polymerizing olefins in the presence of a bulky ligand metallocene-type catalyst compound having at least one fluoride or fluorine containing leaving group.

In one embodiment, the invention relates to a process for polymerizing olefins at a temperature greater than 70° C. in the presence of a catalyst system comprising a bulky ligand metallocene-type catalyst compound having at least one fluoride or fluorine containing leaving group. Preferably the catalyst system is supported.

In another embodiment, the invention is directed towards a process for polymerizing two or more alpha-olefins having from 2 to 20 carbon atoms at least one of which is ethylene or propylene in the presence of a catalyst system comprising a bulky ligand metallocene-type catalyst compound having at least one fluoride or fluorine containing leaving group. Preferably the catalyst system is supported.

In yet another embodiment, the invention is directed to a process for polymerizing propylene alone or in combination with one or more other olefins in the presence of a catalyst system comprising a bulky ligand metallocene-type catalyst compound having at least one fluoride or fluorine containing leaving group. Preferably the catalyst system is supported.

In a further embodiment, the invention is directed to various bulky ligand metallocene-type catalyst compounds described below by formulas I through VII, wherein each compound has at least one fluoride (F) leaving group and/or at least one fluorine containing leaving group. Also, the invention relates to catalyst systems of the compounds of formulas I through VII with an activator. Preferably, the invention relates in another embodiment to supported catalysts systems of the compounds of formulas I through VII, preferably formulas I through V below. Lastly, in yet another embodiment, the invention is directed to a process for polymerizing olefins in the presence of a catalyst system comprising any of the bulky ligand metallocene-type compounds represented by formulas I through VII below.

DETAILED DESCRIPTION OF THE INVENTION

Introduction

The invention is directed toward a process for polymerizing olefins in the presence of a bulky ligand metallocene-type catalyst compound having at least one fluoride or fluorine containing leaving group.

It has been surprisingly discovered that fluoride or fluorine containing leaving groups yield bulky ligand metallocene-type catalyst systems having improved activities and productivities. It was especially surprising because it is well known that a fluoride leaving group is more strongly bonded to the metal than any other of the halogens. Meaning that it would be more difficult to abstract a fluoride or fluorine containing leaving group and thus, reducing the activity. In addition, typically when a bulky ligand metallocene-type catalyst system is in a supported form, the activity as well as the productivity of the supported catalyst system decreases. Surprisingly, supporting the organometallic catalyst compounds having a fluoride or a fluorine containing leaving group, the activity and productivity loss is reduced or virtually eliminated.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefins.

The bulky ligands are generally represented by one or more bonding systems comprising π bonds that can be open systems or ring systems or fused ring(s) or ring system(s) or a combination thereof. These system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetradenyl or an imide ligand. The metal atom is preferably selected from Groups 3 through 16 and the lanthanide or actinide series of the Periodic Table of Elements. Preferably the metal is a transition metal from Groups 4 through 12, more preferably 4, 5 and 6, and most preferably the metal is from Group 4.

In one embodiment, the bulky ligand metallocene-type catalyst compounds of the invention are represented by the formula:

$$L^A L^B M Q_n \quad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium.

The bulky ligands, $L^A$ and $L^B$, are open or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, indenyl ligands, benzindenyl ligands, fluorenyl ligands, octahydrofluorenyl ligands, cyclooctatetradenyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-5 bonding to M. In another embodiment, $L^A$ and $L^B$ may comprise one or more heteroatoms, for example, nitrogen, silicon, boron, germanium, sulfur and phosphorous, in combination with carbon atoms to form a π bonding systems that can be open, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment in formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched, cyclic alkyl radicals, or alkenyl, alkynl or aryl radicals, or combination thereof. In a preferred embodiment, substituent groups R have up to 50 non-hydrogen atoms, preferably from 1 to 30 carbon atoms that can also be substituted with halogens or heteroatoms or the like. Non-limiting examples of alkyl or aryl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other halohydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that formula (I) above represents a neutral bulky ligand metallocene-type catalyst compound.

In this invention, at least one Q, or the leaving group in the above formula (I) is a fluoride leaving group (F) or a fluorine containing ligand. Examples of fluorine containing ligands include those represented by the formula: $FR^1$, where $R^1$ is alkyl, alkoxide, alkylaryl or unsaturated hydrocarbon or an R as defined above for formula (I). Non-limiting examples of fluorine containing ligands include fluoroalkyl, fluoroaryls, fluoroalkoxides and fluoroalkylaryls, for example, trifluoromethyl, trifluoroethyl, pentafluorophenyl, monofluorovinyl, and the like or combinations thereof. In the most preferred embodiment of the invention, the bulky ligand metallocene-type catalyst compounds or organometallic catalysts of the invention have at least one leaving group that is fluoride (F), preferably all the leaving groups are fluorides (F).

Non-limiting examples of other Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene-type catalyst compounds of the invention include those of formula I where $L^A$ and $L^B$ are bridged to each other by a bridging group, A. These bridged compounds are known as bridged, bulky ligand metallocene-type catalyst compounds. Non-limiting examples of bridging group A include bridging groups containing at least one Group 13 to 16 atom, often referred to a divalent moiety such as but not limited to at least one of a carbon, oxygen, nitrogen, silicon, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens.

In another embodiment, the bulky ligand metallocene-type catalyst compound of the invention is represented by the formula:

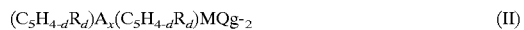

$$(C_5H_{4-d}R_d)A_x(C_5H_{4-d}R_d)MQg_{-2} \qquad (II)$$

where M is a Group 4, 5, 6 transition metal, $(C_5H_{4-d}R_d)$ is an unsubstituted or substituted, cyclopentadienyl ligand or cyclopentadienyl-type bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of, carbon, germanium, boron, silicon, tin, phosphorous or nitrogen atom containing radical bridging two $(C_5H_{4-d}R_d)$ rings; more particularly, non-limiting examples of bridging group A may be represented by $R'_2C$, $R'_2Si$, $R'_2Si\ R'_2Si$, $R'_2Si\ R'_2C$, $R'_2Ge$, $R'_2Si\ R'_2R'_2Ge$, $R'_2GeR'_2C$, $R'N$, $R'P$, $R'_2C\ R'N$, $R'_2C\ R'P$, $R'_2Si\ R'N$, $R'_2Si\ R'P$, $R'_2GeR'N$, $R'_2Ge\ R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system; and independently, each Q can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof; also, two Q's together may form an alkylidene ligand or cyclometallated hydrocarbyl ligand or other divalent anionic chelating ligand, where g is an integer corresponding to the formal oxidation state of M, and d is an integer selected from 0, 1, 2, 3 or 4 and denoting the degree of substitution, x is an integer from 0 to 1; and at least one Q is fluoride (F) or a fluorine containing ligand. In the above formulas (I) and (II), in an embodiment, the formulas exclude the compound bis(pentamethylcyclopentadienyl) zirconium difluoride.

In one embodiment, the bulky ligand metallocene-type catalyst compounds are those where the R substituents on the bulky ligands $L^A$, $L^B$, $(C_5H_{4-d}R_d)$ of formulas (I) and (II) are substituted with the same or different number of substituents on each of the bulky ligands. In another embodiment, the bulky ligands $L^A$, $L^B$, $(C_5H_{4-d}R_d)$ of formulas (I) and (II) are different from each other.

Other bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference. Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398 and 5,753,578 and PCT publications WO 93/08221, WO 93/08199, WO 95/07140, WO 98/11144 and European publications EP-A-0 578 838, EP-A-0 638 595, EP-B-0 513 380, EP-A1-0 816 372, EP-A2-0 839 834 and EP-B1-0 632 819, all of which are herein fully incorporated by reference.

In another embodiment, the bulky ligand metallocene-type catalyst compound is represented by the formula:

$$L^C AJMQ_n \quad \quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand at least one of which is fluoride (F) or a fluorine containing ligand; and n is the integer 0,1 or 2. In formula (III) above, $L^C$, A and J form a fused ring system. In an embodiment, $L^C$ of formula (III) is as defined above for $L^A$ in formula (I), and A, M and Q of formula (III) are as defined above in formula (I).

In another embodiment of this invention the bulky ligand metallocene-type catalyst compound useful in the invention is represented by the formula:

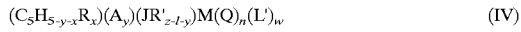

$$(C_5H_{5-y-x}R_x)(A_y)(JR'_{z-l-y})M(Q)_n(L')_w \quad \quad (IV)$$

where M is a transition metal from Group 4 in any oxidation state, preferably, titanium, zirconium or hafnium, most preferably titanium in either a +2, +3 or +4 oxidation state. A combination of compounds represented by formula (IV) with the transition metal in different oxidation states is also contemplated. $L^C$ is represented by $(C_5H_{5-y-x}R_x)$ and is a bulky ligand as described above. More particularly $(C_5H_{5-y-x}R_x)$ is a cyclopentadienyl ring or cyclopentadienyl-type ring or ring system which is substituted with from 0 to 5 substituent groups R, and "x" is 0, 1, 2, 3 or 4 denoting the degree of substitution. Each R is, independently, a radical selected from a group consisting of 1 to 30 non-hydrogen atoms. More particularly, R is a hydrocarbyl radical or a substituted hydrocarbyl radical having from 1 to 30 carbon atoms, or a hydrocarbyl-substituted metalloid radical where the metalloid is a Group 14 or 15 element, preferably silicon or nitrogen or a combination thereof, and halogen radicals and mixtures thereof. Substituent R groups also include silyl, germyl, amine, and hydrocarbyloxy groups and mixtures thereof. Also, in another embodiment, $(C_5H_{5-y-x}R_x)$ is a cyclopentadienyl ligand in which two R groups, preferably two adjacent R groups are joined to form a ring or ring system having from 3 to 50 atoms, preferably from 3 to 30 carbon atoms. This ring system may form a saturated or unsaturated polycyclic cyclopentadienyl-type ligand such as those bulky ligands described above, for example, indenyl, tetrahydroindenyl, fluorenyl or octahydrofluorenyl.

The $(JR'_{z-l-y})$ of formula (IV) is a heteroatom containing ligand in which J is an element with a coordination number of three from Group 15 or an element with a coordination number of two from Group 16 of the Periodic Table of Elements. Preferably J is a nitrogen, phosphorus, oxygen or sulfur atom with nitrogen being most preferred. Each R' is, independently, a radical selected from the group consisting of hydrocarbyl radicals having from 1 to 20 carbon atoms, or as defined for R in formula (I) above. The "y" is 0 or 1, and the "z" is the coordination number of the element J. In one embodiment, in formula (IV), the J of formula (III) is represented by $(JR'_{z-l-y})$.

In formula (IV) each Q is, independently, any univalent anionic ligand such as halogen, hydride, or substituted or unsubstituted hydrocarbyl having from 1 to 30 carbon atoms, alkoxide, aryloxide, sulfide, silyl, amide or phosphide. Q may also include hydrocarbyl groups having ethylenic unsaturation thereby forming $\eta^3$ bond to M. Also, two Q's may be an alkylidene, a cyclometallated hydrocarbyl or any other divalent anionic chelating ligand. The integer n may be 0, 1, 2 or 3; and at least one Q is a fluoride (F) or a fluorine containing ligand.

The A of formula (IV) is a covalent bridging group containing a Group 13 to 16 element, preferably a Group 14 and 15 element, most preferably a Group 14 element. Non-limiting examples of bridging group A include a dialkyl, alkylaryl or diaryl silicon or germanium radical, alkyl or aryl phosphine or amine radical, or a hydrocarbyl radical such as methylene, ethylene and the like.

Optionally associated with formula (IV) is L', a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2 or 3.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$$L^D MQ_2(YZ)A_n \quad \quad (V)$$

where M is a Group 3 to 16 metal, preferably a Group 4 to 12 transition metal, and most preferably a Group 4, 5 or 6 transition metal; $L^D$ is a substituted or unsubstituted bulky ligand that is bonded to M; each Q is independently bonded to M and $Q_2(YZ)$ forms a unicharged polydentate ligand; A is a univalent anionic ligand also bonded to M; n is 1 or 2; and at least one of A or Q is fluoride (F) or a fluorine containing ligand.

In another embodiment, M is a Group 4, 5 or 6 transition metal, preferably from Group 4, more preferably titanium, zirconium and hafnium, and most preferably zirconium; $L^D$ is selected from the group of bulky ligands consisting of cyclopentadienyl, indenyl, tetrahydroindenyl, benzindenyl, fluorenyl, octahydrofluorenyl, cyclooctatetraendiyl and including those bulky ligands described above for $L^A$ of formula (I); Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; A is a univalent anionic group when n is 2 or A is a divalent anionic group when n is 1; preferably A is a carbamate, carboxylate, or other heteroallyl moiety described by the Q, Y and Z combination. In another embodiment of formula (V), optionally, $T_m$ is a bridging group bonded to $L^D$ and another $L^D$ of another $L^D MQ_2 YZA_n$ compound, where m is an integer from 2 to 7, preferably 2 to 6, most preferably 2 or 3; and T is selected from the group consisting of alkylene and arylene groups containing from 1 to 10 carbon atoms optionally substituted with carbon or heteroatom(s), germanium, silicon and alkyl phosphine.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum silicon, phosphorous and tin. Examples of these bulky ligand metallocene-type catalyst compounds are described in WO 96/33202, WO 96/34021, WO 97/17379 and WO 98/22486 and U.S. Pat. Nos. 5,637,660, 5,539,124, 5,554,775, 5,756,611, 5,233,049 and 5,744,417, all of which are herein incorporated by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, U.S. Pat. No. 6,103,657 which is herein incorporated by reference.

In one embodiment, the bulky ligand metallocene-type catalyst compound is represented by the formula:

$$((Z)XA_t(YJ))_q MQ_n \qquad (VI)$$

where M is a metal selected from Group 3 to 12 or lanthanide and actinide series of the Periodic Table of Elements; Q is bonded to M and each Q is a monovalent, bivalent, or trivalent anion, provided that at least one Q is fluoride (F) or at least one Q is a fluorine containing radical or a combination thereof; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

In another embodiment, these metallocene-type catalyst compounds are represented by the formula:

$$((R'_m Z)XA_t(YJR''_m))_q MQ_n \qquad (VII)$$

where M is a metal selected from Group 3 to 13 of the Periodic Table of Elements, preferably a Group 4 to 12 transition metal, more preferably a Group 4, 5 or 6 transition metal, even more preferably a Group 4 transition metal such as titanium, zirconium or hafnium, and most preferably zirconium;

Each Q is bonded to M and each Q is a monovalent, bivalent, or trivalent anion provided that at least one Q is a fluoride (F) or a fluorine containing group or a combination thereof. Preferably each Q is independently selected from the group consisting of halogens, hydrogen, alkyl, aryl, alkenyl, alkylaryl, arylalkyl, hydrocarboxy or phenoxy radicals having 1–20 carbon atoms. Each Q may also be amides, phosphides, sulfides, silylalkyls, diketonates, and carboxylates. Optionally, each Q may contain one or more heteroatoms, more preferably each Q is selected from the group consisting of halides, alkyl radicals and arylalkyl radicals. Most preferably, each Q is selected from the group consisting of arylalkyl radicals such as benzyl.

X and Y are preferably each heteroatoms, more preferably independently selected from the group consisting of nitrogen, oxygen, sulfur and phosphorous, even more preferably nitrogen or phosphorous, and most preferably nitrogen;

Y is contained in a heterocyclic ring or ring system J. J contains from 2 to 30 carbon atoms, preferably from 2 to 7 carbon atoms, more preferably from 3 to 6 carbon atoms, and most preferably 5 carbon atoms. Optionally, the heterocyclic ring J containing Y, may contain additional heteroatoms. J may be substituted with R" groups that are independently selected from the group consisting of hydrogen or linear, branched, cyclic, alkyl radicals, or alkenyl, alkynl, alkoxy, aryl or aryloxy radicals. Also, two or more R" groups may be joined to form a cyclic moiety such as an aliphatic or aromatic ring. Preferably R" is hydrogen or an aryl group, most preferably R" is hydrogen. When R" is an aryl group and Y is nitrogen, a quinoline group is formed. Optionally, an R" may be joined to A;

Z is a hydrocarbyl group bonded to X, preferably Z is a hydrocarbyl group of from 1 to 50 carbon atoms, preferably Z is a cyclic group having from 3 to 30 carbon atoms, preferably Z is a substituted or unsubstituted cyclic group containing from 3 to 30 carbon atoms, optionally including one or more heteroatoms, more preferably Z is an aryl group, most preferably a substituted aryl group;

Z may be substituted with R' groups that are independently selected from group consisting of hydrogen or linear, branched, alkyl radicals or cyclic alkyl, alkenyl, alkynl or aryl radicals. Also, two or more R' groups may be joined to form a cyclic moiety such as an aliphatic or aromatic ring. Preferably R' is an alkyl group having from 1 to 20 carbon atoms, more preferably R' is methyl, ethyl, propyl, butyl, pentyl and the like, including isomers thereof, more preferably R' is a secondary or tertiary hydrocarbon, including isopropyl, t-butyl and the like, most preferably R' is an isopropyl group. Optionally, an R' group may be joined to A. It is preferred that at least one R' is ortho to X;

When t is 1, A is a bridging group joined to at least one of, preferably both of, X and J. Bridging group A contains one or more Group 13 to 16 elements from Periodic Table of Elements. More preferably A contains one or more Group 14 elements, most preferably A is a substituted carbon group, a di-substituted carbon group or vinyl group; and In formula (VII) m is independently an integer from 0 to 5, preferably 2; n is an integer from 1 to 4 and typically depends on the oxidation state of M; and q is 1 or 2, and where q is 2, the two $((R'_m Z)XA(YJR''_m))$ of formula (VII) are bridged to each other via a bridging group, preferably a bridging group containing a Group 14 element. Also, in a preferred embodiment, the compound represented by formula (VI) or (VII) may be contacted with acetone.

Other Bulky Ligand Metallocene-Type Catalyst Compounds

It is within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene-type catalysts are those Group 5 and 6 metal imido complexes described in EP-A2-0 816 384, which is incorporated herein by reference. In addition, bulky ligand metallocene-type catalysts include bridged bis(arylamido) Group 4 compounds described by D. H. McConville, et al., in Organometallics 1195, 14, 5478–5480, which is herein incorporated by reference.

It is also contemplated that in one embodiment, the bulky ligand metallocene-type catalysts of the invention described above include their structural or optical or enantiomeric isomers (meso and racemic isomers) and mixtures thereof. For all the patents and publications incorporated herein by reference the catalyst compounds described therein for purposes of this patent specification all have at least one fluoride (F) leaving group or fluorine containing leaving group.

Activator and Activation Methods for the Bulky Ligand Metallocene-Type Catalyst Compounds The above described bulky ligand metallocene-type catalyst compounds having a least one fluoride leaving group or a fluorine containing leaving group are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the bulky ligand metallocene-type catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand metallocene-type catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor that would ionize the neutral bulky ligand metallocene-type catalyst compound.

In one embodiment, an activation method using ionizing ionic compounds not containing an active proton but capable of producing both a bulky ligand metallocene-type catalyst cation and a non-coordinating anion are also contemplated, and are described in EP-A-0426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene-type catalyst compounds with perchlorates, periodates and iodates including their hydrates. WO 98/30602 and WO 98/30603 incorporated by reference describe the use of lithium (2,2'-bisphenyl-ditrimethylsilicate)•4THF as an activator for a bulky ligand metallocene-type catalyst compound. Also, methods of activation such as using radiation (see EP-B1-0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins.

It is also within the scope of this invention that the above described bulky ligand metallocene-type catalyst compounds can be combined with one or more of the catalyst compounds represented by formulas (I) through (VII) with one or more activators or activation methods described above.

It is further contemplated by the invention that other catalysts can be combined with the bulky ligand metallocene-type catalyst compounds of the invention. For example, see U.S. Pat. Nos. 4,937,299, 4,935,474, 5,281,679, 5,359,015, 5,470,811, and 5,719,241 all of which are herein fully incorporated herein reference. It is also contemplated that any one of the bulky ligand metallocene-type catalyst compounds of the invention having at least one fluoride or fluorine containing leaving group as described above, may be used with any other bulky ligand metallocene-type catalyst compound not having a fluoride or fluorine containing leaving group.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Method for Supporting

The above described bulky ligand metallocene-type catalyst compounds and catalyst systems may be combined with one or more support materials or carriers using one of the support methods well known in the art or as described below. In the preferred embodiment, the method of the invention uses a polymerization catalyst in a supported form. For example, in a most preferred embodiment, a bulky ligand metallocene-type catalyst compound or catalyst system is in a supported form, for example deposited on, contacted with, or incorporated within, adsorbed or absorbed in, or on, a support or carrier.

The terms "support" or "carrier" are used interchangeably and are any support material, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665) and the like. Also, combinations of these support materials may be used, for example, silica-chromium, silica-alumina, silica-titania and the like.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu$m. More preferably, the surface area of the carrier is in the range of from about 50 to about 500 $m^2/g$, pore volume of from about 0.5 to about 3.5 cc/g and average particle size of from about 10 to about 200 $\mu$m. Most preferably the surface area of the carrier is in the range is from about 100 to about 400 $m^2/g$, pore volume from about 0.8 to about 3.0 cc/g and average particle size is from about 5 to about 100 $\mu$m. The average pore size of the carrier of the invention typically has pore size in the range of from 10 to 1000 Å, preferably 50 to about 500 Å, and most preferably 75 to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664 and U.S. application Ser. Nos. 271,598 filed Jul. 7, 1994 and 788,736 filed Jan. 23, 1997 and PCT publications WO 95/32995, WO 95/14044, WO 96/06187 and WO 97/02297 all of which are herein fully incorporated by reference.

In one embodiment, the bulky ligand metallocene-type catalyst compounds of the invention may be deposited on the same or separate supports together with an activator, or the activator may be used in an unsupported form, or may be deposited on a support different from the supported bulky ligand metallocene-type catalyst compounds of the invention, or any combination thereof.

There are various other methods in the art for supporting a polymerization catalyst compound or catalyst system of the invention. For example, the bulky ligand metallocene-type catalyst compound of the invention may contain a polymer bound ligand as described in U.S. Pat. Nos. 5,473,202 and 5,770,755, which is herein fully incorporated by reference; the bulky ligand metallocene-type catalyst system of the invention may be spray dried as described in U.S. Pat. No. 5,648,310, which is herein fully incorporated by reference; the support used with the bulky ligand metallocene-type catalyst system of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a supported bulky ligand metallocene-type catalyst system that includes an antistatic agent or surface modifier that is used in the preparation of the supported catalyst system as described in PCT publication WO 96/11960, which is herein fully incorporated by reference. The catalyst systems of the invention can be prepared in the presence of an olefin, for example hexene-1.

A preferred method for producing the supported bulky ligand metallocene-type catalyst system of the invention is described below and is described in U.S. application Ser. Nos. 265,533, filed Jun. 24, 1994 and 265,532, filed Jun. 24, 1994 and PCT publications WO 96/00245 and WO 96/00243 both published Jan. 4, 1996, all of which are herein fully incorporated by reference. In this preferred method, the bulky ligand metallocene-type catalyst compound is slurried in a liquid to form a metallocene solution and a separate solution is formed containing an activator and a liquid. The liquid may be any compatible solvent or other liquid capable of forming a solution or the like with the bulky ligand metallocene-type catalyst compounds and/or activator of the invention. In the most preferred embodiment the liquid is a cyclic aliphatic or aromatic hydrocarbon, most preferably toluene. The bulky ligand metallocene-type catalyst compound and activator solutions are mixed together and added to a porous support or the porous support is added to the solutions such that the total volume of the bulky ligand metallocene-type catalyst compound solution and the activator solution or the bulky ligand metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the metal of the supported bulky ligand metallocene-type catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the bulky ligand metallocene-type catalyst is preferably in the range of between 0.3:1 to 3:1. Where an unsupported bulky ligand metallocene-type catalyst system is utilized, the mole ratio of the metal of the activator component to the metal of the bulky ligand metallocene-type catalyst compound is in the range of between 0.3:1 to 10,000:1, preferably 100:1 to 5000:1, and most preferably 500:1 to 2000:1.

In one embodiment of the invention, olefin(s), preferably $C_2$ to $C_{30}$ olefin(s) or alpha-olefin(s), preferably ethylene or propylene or combinations thereof are prepolymerized in the presence of the bulky ligand metallocene-type catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein filly incorporated by reference.

In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed to a reactor as described in PCT publication WO 97/46599, which is fully incorporated herein by reference.

Polymerization Process

The catalysts and catalyst systems of the invention described above are suitable for use in any polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene-type catalysts having a fluoride (F) or a fluorine containing leaving group as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is filly incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference A preferred process of the invention is where the process, preferably a slurry or gas phase process is operated in the presence of a bulky ligand metallocene-type catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference. In another preferred embodiment of the process of the invention, the process is operated by introducing a carboxylate metal salt into the reactor and/or contacting a carboxylate metal salt with the bulky ligand metallocene-type catalyst system of the invention prior to its introduction into the reactor. These embodiments of this invention are described in U.S. application Ser. No. 09/113,216 filed Jul. 10, 1998.

Polymer Product of the Invention

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene-type catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene-type catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65.

In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The properties of the polymer were determined by the following test methods:

Density is measured in accordance with ASTM-D-1238.

Example 1

Preparation of rac/meso bis(1,3-methylbutylcyclopentadienyl)zirconium difluoride To a murky green solution of rac/meso bis(1,3-methylbutylcyclopentadienyl) zirconium dichloride [(1,3-MeBuCp)ZrCl$_2$] (1.00 g, 2.31 mmol, 1.00 eq.) in dichloromethane (10 mL) was added tributyltin fluoride (1.50 g, 4.85 mmol, 2.10 eq.). The reaction rapidly lightened, becoming greenish-yellow. The reaction was stirred 2 hours to give a straw brown mixture which was filtered to give a light brown solution and a small amount of white solid. The solution was then evaporated in vacuo, leaving a soupy brown solid. Pentane (10 mL) was added and the mixture was cooled to −35° C. The mixture was filtered, and the resulting white solid was washed with pentane (3×3 mL) cooled to −35° C. The white solid was dried in vacuo to yield 0.70 g (76%). $^1$H NMR(C$_6$D$_6$): δ0.86 (t, 6H, CH$_2$CH$_2$CH$_2$$\underline{CH_3}$), 1.19–1.35 (m, 4H, CH$_2$$\underline{CH_2}$CH$_2$CH$_3$), 1.37–1.51 (m $\overline{4H}$, CH$_2$CH$_2$$\overline{CH_2}$CH$_3$), 2.02 (s, $\overline{6H, Me}$), 2.31–2.43 (m, 2H, $\underline{CH_2}$CH$_2$CH$_2$CH$_3$), 2.47–2.59 (m, 2H, $\underline{CH_2}$CH$_2$CH$_2$CH$_3$), $\overline{5.55}$ (m, 2H, Cp-H), 5.63 (m, 2H, Cp-$\overline{H}$), $\overline{5.72}$ (br s, 2H, Cp-H). $^{19}$F NMR(C$_6$D$_6$): meso isomer δ32.4 (d, $^2$J=30), 33.5 (d, $^2$J=30); rac isomer d 33.0 (s).

Example 2

Preparation of (tetramethylcyclopentadienyl)(propylcyclopentadienyl) zirconium difluoride To a yellow solution of (tetramethylcyclopentadienyl)(propylcyclopentadienyl) zirconium dichloride [(Me$_4$Cp)(PrCp)ZrCl$_2$] (1.00 g, 2.47 mmol, 1.00 eq.) in dichloromethane (10 mL) was added tributyltin fluoride (1.60 g, 5.18 mmol, 2.09 eq.). The reaction quickly lightened, becoming almost colorless with a small amount of tributyltin fluoride still visible. The reaction was stirred 1 h and was then filtered to give a colorless solution and a small amount of white solid. The solution was evaporated in vacuo, leaving a damp, white solid. Pentane (15 mL) was added and the mixture was cooled to −35° C. The mixture was filtered, and resulting white solid was washed with pentane (3×3 mL) cooled to −35° C. The white solid was dried in vacuo to yield 0.88 g (96%). $^1$H NMR(CD$_2$Cl$_2$): δ0.92 (t, 3H, CH$_2$CH$_2$$\underline{CH_3}$), 1.55 (m, 2H, CH$_2$$\underline{CH_2}$CH$_3$), 1.82 (s, 6H, Me), 199 (s, $\overline{6H, Me}$), 2.42 (t, 2H, $\underline{CH_2}$CH$_2$CH$_3$), 5.93 (s, 1H, ring-H), 5.96 (br m, 2H, ring-$\overline{H}$), 6.17 (m, 2H, ring-H). $^{19}$F NMR (CD$_2$Cl$_2$): δ17.5 (s).

Example 3

Preparation of bis(propylcyclopentadienyl) zirconium difluoride

To a straw yellow solution of bis(propylcyclopentadienyl) zirconium dichloride [(PrCp)$_2$ZrCl$_2$] (1.00 g, 2.66 mmol, 1.00 eq.) in dichloromethane (10 mL) was added tributyltin fluoride (1.72 g, 5.57 mmol, 2.10 eq.). The reaction rapidly lightened, turning almost colorless. The reaction was stirred 1 h and was then filtered to give a colorless solution and a small amount of white solid. The solution was evaporated in vacuo, leaving a damp, white solid. Pentane (10 mL) was added and the mixture was cooled to −35° C. The mixture was filtered, and resulting white solid was washed with pentane (3×3 mL) cooled to −35° C. The white solid was dried in vacuo to yield 0.75 g (82%). $^1$H NMR(CD$_2$Cl$_2$): δ0.92 (t, 6H, CH$_2$CH$_2$$\underline{CH_3}$), 1.56 (m, 4H, CH$_2$$\underline{CH_2}$CH$_3$), 2.44 (t, 4H, $\underline{CH_2}$CH$_2$$\overline{CH_3}$), 6.05 (m, 4H, ring-$\overline{H}$), $\overline{6.30}$ (m, 4H, ring-H). $^{19}$F NMR(CD$_2$Cl$_2$): δ20.4 (s).

Example 4

Preparation of Supported rac/meso bis(1,3-methylbutylcyclopentadienyl) zirconium difluoride 37.23 g of 30 wt % MAO (methylalumoxane) (available from Albemarle, Memphis, Tenn.) in toluene and 39.00 g toluene were combined to give a clear, colorless solution. The solution was stirred 15 min., then 0.641 g rac/meso bis(1,3-methylbutylcyclopentadienyl)zirconium difluoride [(1,3 Me BuCp)$_2$ZrF$_2$] synthesized in Example 1 was added. The solution turned light yellow and was stirred 15 min. 30.00 g Davison 948 silica (50μ, dried at 600° C.) (available from W.R. Grace Corporation, Davison Division, Baltimore, Md.) was then added and the resulting thick mixture was stirred by hand using a spatula for 10 min. The mixture was dried 20 hours in vacuo to give 41.86 g light yellow, free-flowing solid.

Example 5

Preparation of Supported rac/meso bis(1,3-methylbutylcyclopentadienyl) zirconium dichloride Rac/meso bis(1,3-methylbutylcyclopentadienyl) zirconium dichloride of Example 1 was supported in a manner similar to that used in Example 4 except using 37.30 g of 30 wt % MAO and 0.695 g rac/meso bis(1,3-methylbutylcyclopentadienyl)zirconium dichloride, which yielded 41.61 g yellow, free-flowing solid.

Example 6

Preparation of Supported (tetramethylcyclopentadienyl)(propyl cyclopentadienyl)zirconium difluoride (Tetramethylcyclopentadienyl)(propylcyclopentadienyl) zirconium difluoride synthesized in Example 2 was supported in a manner similar to that used in Example 4 except using 37.15 g of 30 wt % MAO and 0.572 g (tetramethylcyclopentadienyl) (propylcyclopentadienyl)zirconium difluoride, which yielded 41.72 g yellow, free-flowing solid.

Example 7

Preparation of Supported (tetramethylcyclopentadienyl) (propyl cyclopentadienyl)zirconium dichloride (Tetramethylcyclopentadienyl)(propylcyclopentadienyl) zirconium dichloride of Example 2 was supported in a manner similar to that used in Example 4 except using 37.21 g of 30 wt % MAO and 0.626 g (tetramethylcyclopentadienyl)(propyl cyclopentadienyl) zirconium dichloride, which yielded 41.79 g yellow solid.

Example 8

Preparation of Supported bis (propylcyclopentadienyl)zirconium difluoride

Bis (propylcyclopentadienyl)zirconium difluoride synthesized in Example 3 was supported in a manner similar to that used in Example 4 except using 37.12 g of 30 wt % MAO and 0.550 g bis(propylcyclopentadienyl)zirconium difluoride, which yielded 41.82 g yellow, free-flowing solid.

Example 9

Preparation of Supported bis (propylcyclopentadienyl)zirconium dichloride

Bis(propylcyclopentadienyl)zirconium dichloride of Example 3 was supported in a manner similar to that used in Example 4 except using 37.18 g of 30 wt % MAO and 0.603 g bis(propylcyclopentadienyl)zirconium dichloride, which yielded 41.40 g light yellow, free-flowing solid.

Example 10

Slurry Polymerizations Using Supported rac/meso bis(1,3-methylbutylcyclopentadienyl)zirconium difluoride To a jacketed, stainless steel 1 liter autoclave previously purged with hot nitrogen and equipped with an inclined-blade impeller and a baffle was added 400 mL isobutane and 30 mL 1-hexene containing 15 μL triethylaluminum. The autoclave was stirred and equilibrated at 85° C. 25 mg supported rac/meso bis(1,3-methylbutylcyclopentadienyl) zirconium difluoride catalyst as prepared in Example 4 was injected into the autoclave using ethylene pressure. The polymerization was maintained at 130 psi (896 kPa) ethylene and 85° C. for 40 min., then the autoclave was vented, cooled and opened. The polymer was isolated and dried overnight under vacuum at 60° C. The yield was 63.26 g. A second run under the same conditions yielded 61.10 g.

Example 11

Slurry Polymerizations Using Supported rac/meso bis(1,3-methylbutylcyclopentadienyl)zirconium dichloride Three polymerizations were run under the same conditions used in Example 10 except 25 mg of the supported rac/meso bis(1,3-methylbutylcyclopentadienyl)zirconium dichloride of Example 5 was used. The polymerizations yielded 40.87 g, 35.01 g and 37.86 g of polymer, respectively.

Example 12

Slurry Polymerization Using Supported (tetramethylcyclopentadienyl) (propylcyclopentadienyl)zirconium difluoride Three polymerizations were run under the same conditions used in Example 10 except 25 mg of supported (tetramethylcyclopentadienyl) (propyl cyclopentadienyl) zirconium difluoride of Example 6 was used. The polymerization yielded 74.11 g, 67.74 g and 69.56 g of polymer, respectively.

Example 13

Slurry Polymerization Using Supported (tetramethylcyclopentadienyl) (propylcyclopentadienyl)zirconium dichloride Three polymerizations were run under the same conditions used in Example 10 except 25 mg of supported (tetramethylcyclopentadienyl) (propyl cyclopentadienyl) zirconium dichloride of Example 7 was used. The polymerizations yielded 58.04 g, 54.99 g and 56.89 g of polymer, respectively.

Example 14

Slurry Polymerization Using Supported bis (propylcyclopentadienyl) zirconium difluoride Three polymerizations were run under the same conditions used in Example 10 except 25 mg of supported bis(propylcyclopentadienyl)zirconium difluoride of Example 8 was used. The polymerizations yielded 100.31 g, 88.20 g and 110.57 g of polymer, respectively.

Example 15

Slurry Polymerization Using Supported bis (propylcyclopentadienyl) zirconium dichloride Two polymerizations were run under the same conditions used in Example 10 except 25 mg of supported bis (propylcyclopentadienyl)zirconium dichloride of Example 9 was used. The polymerizations yielded 84.20 g and 77.36 g of polymer, respectively.

The slurry polymerization data is tabulated in Table 1.

TABLE 1

| Catalyst | Example | Catalyst Amount | Zr ($\mu$mol) | Polymer yield | Catalyst Activity |
|---|---|---|---|---|---|
| rac/meso (1,3 MeBuCp)$_2$ZrF$_2$ | 10A | 25 mg | 0.96 | 63.26 g | 3796 g/g hr |
| rac/meso (1,3 MeBuCp)$_2$ZrF$_2$ | 10B | 25 mg | 0.96 | 61.10 g | 3666 g/g hr |
| rac/meso (1,3 MeBuCp)$_2$ZrCl$_2$ | 11A | 25 mg | 0.96 | 40.87 g | 2452 g/g hr |
| rac/meso (1,3 MeBuCp)$_2$ZrCl$_2$ | 11B | 25 mg | 0.96 | 35.01 g | 2100 g/g hr |
| rac/meso (1,3 MeBuCp)$_2$ZrCl$_2$ | 11C | 25 mg | 0.96 | 37.86 g | 2272 g/g hr |
| (Me$_4$Cp)(PrCp)ZrF$_2$ | 12A | 25 mg | 0.96 | 74.11 g | 4447 g/g hr |
| (Me$_4$Cp)(PrCp)ZrF$_2$ | 12B | 25 mg | 0.96 | 67.74 g | 4064 g/g hr |
| (Me$_4$Cp)(PrCp)ZrF$_2$ | 12C | 25 mg | 0.96 | 69.56 g | 4174 g/g hr |
| (Me$_4$Cp)(PrCp)ZrCl$_2$ | 13A | 25 mg | 0.96 | 58.04 g | 3482 g/g hr |
| (Me$_4$Cp)(PrCp)ZrCl$_2$ | 13B | 25 mg | 0.96 | 54.99 g | 3299 g/g hr |
| (Me$_4$Cp)(PrCp)ZrCl$_2$ | 13C | 25 mg | 0.96 | 56.89 g | 3413 g/g hr |
| (PrCp)$_2$ZrF$_2$ | 14A | 25 mg | 0.96 | 100.31 g | 6019 g/g hr |
| (PrCp)$_2$ZrF$_2$ | 14B | 25 mg | 0.96 | 88.20 g | 5292 g/g hr |
| (PrCp)$_2$ZrF$_2$ | 14C | 25 mg | 0.96 | 110.57 g | 6634 g/g hr |
| (PrCp)$_2$ZrCl$_2$ | 15A | 25 mg | 0.96 | 84.20 g | 5052 g/g hr |
| (PrCp)$_2$ZrCl$_2$ | 15B | 25 mg | 0.96 | 77.36 g | 4642 g/g hr |

Example 16

Gas Phase Polymerization Using Supported rac/meso bis(1,3-methylbutyl cyclopentadienyl) zirconium difluoride A 1.03 MI, 0.9172 density copolymer was made using supported rac/meso bis(1,3-methylbutylcyclopentadienyl) zirconium difluoride of Example 4 in a continuous fluid bed gas phase reactor having an ethylene concentration of 35 mol % at 300 psig total pressure (2069 kPag) and 175° F. (79° C.). The residence time was 4.1 hours and the catalyst productivity was 2732 g/g.

Example 17

Gas Phase Polymerization Using Supported rac/meso bis(1,3-methylbutylcyclopentadienyl) zirconium dichloride A 1.06 MI, 0.9173 density copolymer was made using supported rac/meso bis (1,3-methylbutylcyclopentadienyl) zirconium dichloride of Example 5 in a continuous fluid bed gas phase reactor having an ethylene concentration of 35 mol % at 300 psig total pressure (2069 kPag) and 175° F. (79° C.). The residence time was 4.8 hours and the catalyst productivity was 2309 g/g.

Example 18

Preparation of rac-dimethylsilylbis (tetrahydroindenyl)zirconium difluoride

To a murky green-yellow solution of rac-dimethylsilyl-bis(tetrahydroindenyl)zirconium dichloride [DMS bis (THI) ZrCl$_2$] (1.00 g, 2.19 mmol, 1.00 eq.) in dichloromethane (15 mL) was added tributyltin fluoride (1.42 g, 4.59 mmol, 2.10 eq.). The reaction lightened immediately. The reaction was stirred for one hour and was then filtered to give a straw-yellow solution and a small amount of brownish solid. The solution was then evaporated in vacuo, leaving a manila-colored, thick suspension. The suspension was washed with pentane (20 mL, then 3×5 mL) to give a white, micro crystalline solid. The solid was dried in vacuo to yield 0.76 g (82%). $^1$H NMR (CD$_2$Cl$_2$): $\delta$0.80 (s, 6H, SiMe$_2$, 1.45–1.9 and 2.4–2.7 (br m, 16H, aliphatic-ring-H), 5.61 (d, 2H, cyclopentadienyl-ring-H), 6.27 (br s, 2H, cyclopentadienyl-ring-H). $^{19}$F NMR (CD$_2$Cl$_2$): $\delta$19.9 (s).

Example 19

Preparation of Supported rac-dimethylsilyl bis (tetrahydroindenyl)zirconium dichloride A rac-Dimethylsilyl bis(tetrahydroindenyl)zirconium dichloride of Example 18 was supported in a manner similar to that described in Example 4 except using 37.34 g of 30 wt % MAO and 0.735 g rac-dimethylsilyl bis (tetrahydroindenyl)zirconium dichloride [DMS bis (THI) ZrCl$_2$], which yielded 42.09 g yellow solid.

Example 20

Preparation of Supported rac-dimethylsilyl bis (tetrahydroindenyl)zirconium difluoride A rac-Dimethylsilyl bis(tetrahydroindenyl)zirconium difluoride synthesized in Example 18 was supported in a manner similar that described in Example 4 except using 37.28 g of 30 wt % MAO and 0.681 g rac-dimethylsilyl bis(tetrahydroindenyl)zirconium difluoride [DMS bis (THI) ZrF$_2$], which yielded 42.28 g yellow, free-flowing solid.

Example 21

Ethylene Slurry Polymerization Using Supported rac-dimethylsilyl bis (tetrahydroindenyl)zirconium difluoride Three polymerizations were run under the same conditions used in Example 10 except 15 mL hexene and 25 mg of supported rac-dimethylsilyl bis (tetrahydroindenyl) zirconium difluoride of Example 20 was used. The polymerizations yielded 42.64 g, 47.57 g and 49.65 g of polymer, respectively. The polymerization results are given in Table 2 below.

Example 22

Ethylene Slurry Polymerization Using Supported rac-dimethylsilyl bis (tetrahydroindenyl)zirconium dichloride Three polymerizations were run under the same conditions used in Example 10 except 15 mL hexene and 25 mg supported rac-dimethylsilyl bis(tetrahydroindenyl) zirconium dichloride of Example 19 was used. The polymerizations yielded 39.40 g, 37.16 g, and 38.18 g of polymer, respectively. The polymerization results are given in Table 2 below.

TABLE 2

| Catalyst | Example | Amount | $\mu$mol Zr | Polymer Yield | Catalyst Activity |
|---|---|---|---|---|---|
| DMS bis (THI) ZrF$_2$ | 21A | 25 mg | 0.96 | 42.64 g | 2558 g/g hr |
| DMS bis (THI) ZrF$_2$ | 21B | 25 mg | 0.96 | 47.57 g | 2854 g/g hr |
| DMS bis (THI) ZrF$_2$ | 22C | 25 mg | 0.96 | 49.65 g | 2979 g/g hr |
| DMS bis (THI) ZrCl$_2$ | 22A | 25 mg | 0.96 | 39.40 g | 2364 g/g hr |
| DMS bis (THI) ZrCl$_2$ | 22B | 25 mg | 0.96 | 37.16 g | 2230 g/g hr |
| DMS bis (THI) ZrCl$_2$ | 22C | 25 mg | 0.96 | 38.18 g | 2291 g/g hr |

Example 23

Propylene Slurry Polymerizations Using Supported rac-dimethylsilyl bis (tetrahydroindenyl)zirconium difluoride To a jacketed, stainless steel 1 liter autoclave previously purged with hot nitrogen and equipped with an inclined-blade impeller and a baffle was added 500 mL liquid propylene and 10 mL pentane containing 20 $\mu$L triethylaluminum. The autoclave was stirred and equilibrated at 70° C. 50 mg supported rac-dimethylsilyl bis(tetrahydroindenyl) zirconium difluoride catalyst of Example 20 was injected into the autoclave using 100 mL liquid propylene. The polymerization was maintained at 70° C. for one hour, then the autoclave was vented, cooled and opened. The polymer was isolated and dried overnight under vacuum at 60° C. The polymer yield was 31.79 g. Two additional runs under the same conditions yielded 33.33 g and 33.22 g of polymer, respectively. These polymerization results are given in Table 3 below.

Example 24

Propylene Slurry Polymerizations Using Supported rac-dimethylsilyl bis (tetrahydroindenyl)zirconium dichloride Three polymerizations were run under the same conditions used in Example 23 except 50 mg of supported rac-dimethylsilyl bis(tetrahydroindenyl) zirconium dichloride of Example 19 was used. The polymerizations yielded 21.76 g, 22.29 g, and 23.20 g of polymer, respectively. The polymerization results are given in Table 3 below.

TABLE 3

| Catalyst | Example | Amount | $\mu$mol Zr | Polymer Yield | Catalyst Activity |
|---|---|---|---|---|---|
| DMS bis (THI) ZrF$_2$ | 23A | 50 mg | 1.92 | 31.79 g | 636 g/g hr |
| DMS bis (THI) ZrF$_2$ | 23B | 50 mg | 1.92 | 33.33 g | 667 g/g hr |
| DMS bis (THI) ZrF$_2$ | 23C | 50 mg | 1.92 | 33.22 g | 664 g/g hr |
| DMS bis (THI) ZrCl$_2$ | 24A | 50 mg | 1.92 | 21.76 g | 435 g/g hr |
| DMS bis (THI) ZrCl$_2$ | 24B | 50 mg | 1.92 | 22.29 g | 446 g/g hr |
| DMS bis (THI) ZrCl$_2$ | 24C | 50 mg | 1.92 | 23.20 g | 464 g/g hr |

While the present invention has been described and illustrated by reference to particular embodiments, those of ordinary skill in the art will appreciate that the invention lends itself to variations not necessarily illustrated herein. For example, it is contemplated that bulky ligand metallocene-type catalyst compounds of the invention may be introduced into a reactor in a mineral oil slurry, or introduced to the process of the invention to boost activity or productivity, or simply to improve operability of the process. For this reason, then, reference should be made solely to the appended claims for purposes of determining the true scope of the present invention.

I claim:

1. A process of polymerizing olefins comprising contacting:

(a) ethylene and at least one comonomer selected from the group consisting of $C_4$ to $C_8$ alpha olefins; and (b) a supported catalyst system comprising a metallocene catalyst compound, the metallocene catalyst compound consisting of a bridged bis-cyclopentadienyl zirconocene catalyst compound comprising at least one fluoride or fluorine containing leaving group;

wherein the polymerization process is a continuous gas phase process conducted at a temperature of greater than 70° C. in a reactor capable of producing polymer at a rate of greater than 227 Kg/hr.

2. The process of claim 1, wherein the metallocene catalyst compound is represented by the formula:

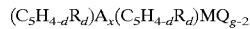

$$(C_5H_{4-d}R_d)A_x(C_5H_{4-d}R_d)MQ_{g-2}$$

wherein M is zirconium;

($C_5H_{4-d}R_d$) is an unsubstituted or substituted ligand bonded to M; each R can be the same or different and is hydrogen, a hydrocarbyl group comprising from 1 to 30 carbon atoms, a substituted hydrocarbyl group comprising from 1 to 30 carbon atoms, combinations thereof; or two or more carbon atoms from adjacent R substituents are joined together to form a substituted or unsubstituted ring or ring system comprising from 4 to 30 carbon atoms;

A is one or more of, or a combination of, carbon, germanium, silicon, tin, phosphorous or nitrogen atom-containing radicals bridging the two ($C_5H_{4-d}R_d$) rings;

each Q which can be the same or different is a hydride, substituted or unsubstituted linear, cyclic or branched, hydrocarbyl comprising from 1 to 30 carbon atoms, a halogen, an alkoxide, an aryloxide, an amide, a phosphide, or combination thereof; wherein at least one Q is a fluoride or fluorine containing leaving group;

g is an integer corresponding to the formal oxidation state of M;

d is 0, 1, 2, 3 or 4; and x is 1.

3. The process of claim 2, wherein g is 4 and d is 1, 2 or 3.

4. The process of claim 2, wherein Q is flourine.

5. The process of claim 2, wherein ($C_5H_{4-d}R_d$) are the same or different and selected from the group consisting of substituted and unsubstituted versions of the following: cyclopentadienyl ligands and tetrahydroindenyl ligands.

6. The process of claim 2, where the substituent group(s) R, when present, are selected from the group consisting of methyl, ethyl, propyl, butyl, pentyl, hexyl, cyclopentyl, cyclohexyl, benzyl, phenyl groups, and isomers thereof.

7. The process of claim 2, wherein A is a group selected from the group consisting of $R'_2C$, $R'_2Si$, $R'_2SiR'_2Si$, $R'_2SiR'_2C$, $R'_2Ge$, $R'_2SiR'_2Ge$, and $R'_2GeR'_2C$; where each R' is independently a hydride, hydrocarbyl, substituted hydrocarbyl, halocarbyl, or substituted halocarbyl.

8. The process of claim 1, where the zirconocene catalyst compound comprises two fluoride leaving groups.

9. The process of claim 1, wherein the process is operated at a pressure greater than 200 psig (1379 kPa).

10. The process of claim 1, wherein the catalyst system comprises an alumoxane.

11. The process of claim 1, wherein the catalyst system comprises an ionic activator or ionizing activator.

12. The process of claim 1, wherein the support is an inorganic oxide.

13. The process of claim 12, wherein the inorganic oxide is silica.

14. The process of claim 1, wherein the comonomer is 1-butene or 1-hexane.

15. The process of claim 1, wherein the process conducted at a temperature of greater than 75° C.

16. The process of claim 1, further comprising combining a carboxylate metal salt.

17. The process of claim 1, wherein the continuous gas phase process comprises the steps of:

(a) introducing a recycle stream into the reactor, the recycle stream comprising ethylene and alpha olefin monomers;

(b) introducing the supported catalyst system;

(c) withdrawing the recycle stream from the reactor;

(d) cooling the recycle stream;

(e) introducing into the reactor additional monomer(s) to replace the monomer(s) polymerized;

(f) reintroducing the recycle stream or a portion thereof into the reactor; and (g) withdrawing a polymer product from the reactor.

18. The process of claim 17, wherein the polymer product is a copolymer having a density in the range of from 0.900 g/cm$^3$ to 0.960 g/cm$^3$; a MWD of from 2 to 10; and an $I_2$ of from 0.1 dg/min to 50 dg/min.

19. The process of claim 17, wherein the polymer product is a copolymer having a density in the range of from 0.910 g/cm$^3$ to 0.940 g/cm$^3$; a MWD of from 2.5 to 8; and an $I_2$ of from 0.1 dg/min to 10 dg/min.

20. The process of claim 17, wherein a film is formed from the polymer product.

21. The process of claim 17, wherein the polymer product has a CDBI value in the range of 55% to 85%.

22. The process of claim 1, wherein the zirconocene catalyst compound is selected from rac-dimethylsilyl bis(tetrahydroindenyl)zirconium difluoride.

* * * * *